April 10, 1934.   A. F. WELCH   1,954,657
REVERSIBLE SPLIT PHASE MOTOR
Filed Nov. 5, 1931

Inventor:
Alfred F. Welch,
by Charles E. Tullar
His Attorney.

Patented Apr. 10, 1934

1,954,657

UNITED STATES PATENT OFFICE 1,954,657

REVERSIBLE SPLIT PHASE MOTOR

Alfred F. Welch, Fort Wayne, Ind., assignor to General Electric Company, a corporation of New York Application November 5, 1931, Serial No. 573,210

6 Claims. (Cl. 172—278)

My invention relates to reversible split phase motors, and its object is to provide a simple, inexpensive motor and control device for reversing service. In carrying my invention into effect, I energize the motor through a transformer with an intermediate tap which is utilized for obtaining a simple reversing of the phase rotation of the motor fluxes.

The features of my invention which are believed to be novel and patentable will be pointed out in the claims appended hereto. For a better understanding of my invention, reference is made in the following description to the accompanying drawing, showing diagrammatically in Figs. 1 to 3, inclusive, three slightly different modifications of the invention all employing a tapped transformer between the motor and supply lines, with switching means between the transformer and motor for reversing and control purposes.

It is well known that if a single phase motor is provided with two primary windings at a suitable angle to each other and the currents in said windings are caused to differ in time phase, we may obtain a field with a rotating component for starting purposes. The means for causing the difference in phase in the angularly displaced windings may vary. For example, the windings themselves may be designed to have different resistances, different reactances, or different relations of resistance to reactance, such that the current in one winding lags behind that in the other. Instead of including the phase displacing constants in the winding themselves, the windings may be made identical, and external resistance or reactance, either inductive or capacitive, may be included in series with or in shunt to one of the windings, or suitable combinations of resistance and reactance may be provided in series or in shunt to both windings. It is immaterial to my invention how this phase split is obtained, as will appear hereinafter.

It is also known that after such a motor as has been referred to above has been started, the phase splitting arrangement may be dispensed with if desired and the motor operated as a pure single phase motor. In accordance with my invention, the reversing switch employed may be used to cut out the phase splitting arrangement, if that is desired, after the motor has been started in either direction.

Figure 1:
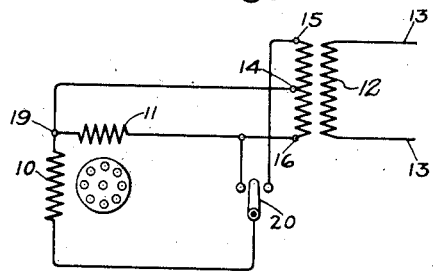

Referring now to the drawing, 10 and 11, Fig. 1, represent the angularly displaced primary windings of a single phase split phase motor. These windings are supplied through a transformer from a single phase source 13. The transformer may be of the double winding type as shown in Fig. 1 at 12, or of the auto-transformer type 22 shown in Fig. 2, and may step the voltage up or down between line and motor if that is desired. In any case, the transformer winding which acts as the secondary is provided with an intermediate connection 14 in addition to exterior connections 15 and 16 at the ends of the winding as shown in Fig. 1, or near its ends, as shown at 17 and 18 in Fig. 2.

Figure 2:
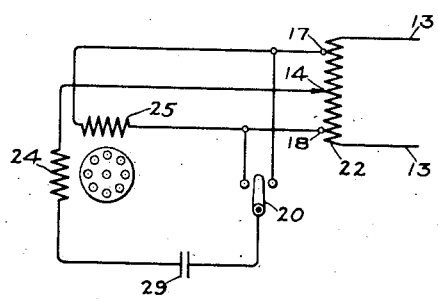

If the torque requirements of the motor are the same in both directions of rotation, the intermediate tap 14 will ordinarily be equally distant from the end taps; but if the torque requirements for one direction of rotation are greater than for the other, or for any other reason the intermediate tap 14 may be correspondingly displaced from the center, as indicated in Fig. 2. The foregoing remarks apply in general to all modifications of the invention represented.

In Fig. 1, transformer tap 14 is connected to the common point 19 of both motor windings 10 and 11. The other end of the winding 11 is permanently connected to transformer connection 16, while the other end of winding 10 may be connected to either of the end connections 15 or 16 of the transformer through the single pole double throw switch 20. It is assumed that the constants of the windings 10 and 11 or their circuits are such that their currents will be out of phase by a suitable angle. For instance, winding 10 may have high resistance as compared to winding 11, and the latter may have high reactance as compared to winding 10. When switch 20 is thrown to the right, connecting winding 10 across transformer connections 14—15, the current in winding 10 will then lead that in winding 11 by, let us say, 90 degrees. The motor will start in a given direction of rotation, and after starting the switch 20 may be left closed for permanent split phase motor operation, or it may be brought back to the open position for pure single phase motor operation. For the opposite direction of rotation, switch 20 is thrown to the left. This connects winding 10 between transformer taps 14—16, but with the phase relation reversed by 180 degrees. Thus, if in the first connection the current of winding 10 led that of winding 11 by 90 degrees, it now leads by 180 plus 90 degrees, which is the equivalent of lagging by 90 degrees. In other words, the phase rotation of the currents of windings 10 and 11 have been reversed and the motor will reverse. As before, we may operate the motor with both windings closed for permanent split phase operation; or after starting we may open switch 20 for pure single phase operation. If it is desired to stop the motor, using switch 20, the latter may be thrown to the reverse momentarily until the motor has been brought approximately to standstill and then the switch opened. The motor will now stop because energized as a pure single phase motor at substantially standstill, under which condition the starting torque is zero. For small motors the switch 20 may be used for starting, stopping, and reversing, leaving transformer 12 energized. For a large motor it may be desirable to completely de-energize the motor in stopping, and if so the usual line switch in the supply circuit may be employed.

In Fig. 2, an auto-transformer 22 is shown for the equivalent purpose of transformer 12 of Fig. 1. The transformer connections show that the voltage across motor tap 17—18 is reduced below the line voltage and permanently connected across motor winding 25. The other winding 24 of the motor may be connected either between taps 14 and 17 or between 14 and 18 through switch 20 to reverse the motor. The intermediate connection 14 is shown adjustable in order to vary the starting torque in the two directions of rotation. After starting in either direction of rotation, the tap 14 may be adjusted to control the running conditions where permanent split phase running is used. The reversing principle is the same as in Fig. 1, it being assumed that the winding circuits are such as to produce suitable out of phase currents therein, and that when switch 20 is reversed the current vector of winding 24 is reversed by 180 degrees to reverse the direction of phase rotation of the motor fluxes. It will be evident that the phase splitting characteristics of the two motor circuits may be in the windings themselves, as in Fig. 1, or in an external reactance, and to illustrate the latter I assume that the windings are similar and employ an external condenser 29 in series with winding 24.

Figure 3:
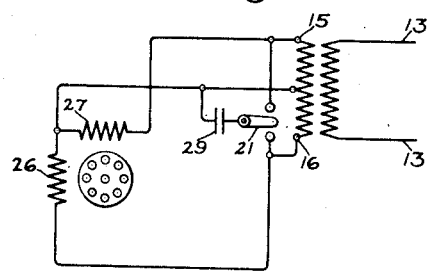

In Fig. 3, the transformer and motor winding connections are permanent, motor winding 26 being connected between transformer taps 14—16 and motor winding 27 being connected between transformer taps 14—15. The windings 26 and 27 have the same, or substantially the same, constants. The phase displacements of the currents in these windings is produced by connecting a condenser 29 in parallel with one or the other through the reversing switch 21. When condenser 29 is in parallel with winding 27, the phase of the current in the latter is retarded with respect to that in winding 26, giving one direction of rotation. When the condenser is parallel with winding 26, the phase of the current in this winding is retarded with respect to that in winding 27, giving the opposite direction of rotation. After starting, switch 21 may be opened for pure single phase operation, or left closed for permanent split phase operation. The motor may be otherwise controlled and its operating condition adjusted as explained in connection with the other arrangements.

In addition to the simple reversing and control feature made possible by the transformer, the latter makes available a low voltage control circuit insulated from line voltage. The invention is susceptible to a variety of modifications, particularly with respect to the method of producing the phase split. Existing single phase motor installations may be changed over for reversing service by the addition of a suitable transformer and the appropriate reversing connection.

Having thus described the principle of operation of my invention, and several modifications thereof, I seek claims commensurate with the true spirit and scope of the invention without limitation as to the particular arrangement employed for carrying it into effect.

What I claim as new and desire to secure by Letters Patent of the United States, is:

1. A single phase motor having two primary windings displaced at an angle to each other, a single phase transformer having three secondary terminals at different voltage points, means for connecting one of said motor windings across two of the voltage connections of said transformer, and connections including a two-way switch for alternately energizing the other winding of said motor from the intermediate voltage connection and either of the two other voltage connections of said transformer for reversing the motor, the motor winding circuits having such characteristics as to cause the currents therein to be out of phase.

2. A single phase motor having primary windings disposed at an angle to each other, a single phase transformer having one intermediate and two exterior secondary terminals, circuit connections between said terminals and windings including a single pole double throw switch the alternate stationary contacts of which are connected directly to the two exterior terminals of said transformer, and the movable contact of which is in a circuit supplied from the intermediate terminal of said transformer, the connections serving to supply phase displaced currents to the two motor windings for one direction of motor operation when the switch is closed in one direction, to reverse the relative phase displacement of said currents for the opposite direction of motor operation when the switch is closed in the opposite direction, and to supply said motor for single phase operation when the switch is open.

3. In combination, a single phase motor having two primary windings displaced at an angle to each other, a single phase transformer having three secondary connections at different voltage points through which the motor windings are energized, the intermediate voltage connection of said transformer being connected to one end of each primary winding and the other two voltage connections of said transformer being connected to the other ends of the two primary windings, respectively, means associated with the motor winding circuits for displacing the phase of the current supplied to the two windings, and a two-way switch for alternately establishing a circuit through the phase displacing means between the intermediate voltage connection of said transformer and the two other voltage connections thereof for reversing said motor.

4. A single phase motor having a pair of primary windings displaced at an angle to each other, a single phase transformer having three secondary terminals at different voltage points, means for connecting one end of both motor windings to the intermediate voltage connection of said transformer, means for connecting the other end of one motor winding to one of the other connections of said transformer, and means including a two-way switch for alternately connecting the other end of the other motor winding to either of the other connections of said transformer, the two motor winding circuits having characteristics which cause the currents flowing therein to be displaced in phase with respect to each other.

5. A single phase motor having a pair of primary windings displaced at an angle to each other and winding circuits of different time phase characteristics, a single phase transformer having a secondary winding with one intermediate terminal and two exterior terminals on either side of the intermediate terminal for connection to the motor winding circuits, connections between one motor winding circuit and the exterior transformer terminals, and connections including a two-way switch for alternately connecting the other motor winding circuit between the intermediate and either of the exterior terminals of said transformer.

6. A single phase motor having a pair of primary windings displaced at an angle to each other, a single phase transformer having an intermediate and two exterior secondary terminals, supply circuits between said motor windings and terminals comprising a common connection between one end of both motor windings and the intermediate transformer terminal, and separate connections from the other ends of said windings to the exterior terminals of said transformer, and a phase modifying reactance arranged to be alternately connected in parallel to either of said windings for reversing the motor.

ALFRED F. WELCH.